(12) United States Patent
Ziech

(10) Patent No.: US 7,740,253 B2
(45) Date of Patent: Jun. 22, 2010

(54) VEHICLE STEER AXLE ASSEMBLY

(75) Inventor: James F. Ziech, Kalamazoo, MI (US)

(73) Assignee: Dana Heavy Vehicle Systems Group LLC, Maumee, OH (US)

( * ) Notice: Subject to any disclaimer, the term of this patent is extended or adjusted under 35 U.S.C. 154(b) by 611 days.

(21) Appl. No.: 11/650,682

(22) Filed: Jan. 8, 2007

(65) Prior Publication Data

US 2008/0164670 A1 Jul. 10, 2008

(51) Int. Cl.
*B62D 7/18* (2006.01)

(52) U.S. Cl. .............................. 280/93.512; 280/93.511

(58) Field of Classification Search ............ 280/93.512, 280/93.511, 93.51, 124.15
See application file for complete search history.

(56) References Cited

U.S. PATENT DOCUMENTS

| | | | |
|---|---|---|---|
| 876,104 A | 1/1908 | Smith | |
| 877,835 A | 1/1908 | Daniel | |
| 1,146,008 A | 7/1915 | Marmon | |
| 1,184,416 A | 5/1916 | Brush | |
| 1,288,574 A | 12/1918 | Harper | |
| 1,367,894 A | 2/1921 | Schofield | |
| 1,438,214 A | 12/1922 | Brady et al. | |
| 1,471,575 A | 10/1923 | Simons | |
| 1,536,597 A | 5/1925 | Lyndon | |
| 1,866,724 A | 7/1932 | Raule | |
| 2,385,170 A | 9/1945 | Tedd | |
| 2,582,455 A | 1/1952 | Potter | |
| 4,798,394 A | 1/1989 | Pollock et al. | |
| 6,499,752 B1 | 12/2002 | Davis | |
| 6,623,019 B2 | 9/2003 | Davis | |
| 6,902,176 B2 * | 6/2005 | Gottschalk | 280/93.512 |
| 7,530,583 B2 * | 5/2009 | Gottschalk | 280/93.512 |
| 2003/0062701 A1 | 4/2003 | Davis | |

FOREIGN PATENT DOCUMENTS

| | | |
|---|---|---|
| EP | 0 201 133 | 11/1986 |
| EP | 1 477 388 A2 | 11/2004 |
| EP | 1307379 B1 | 3/2006 |
| HU | 189511 | 7/1986 |
| JP | 8142895 | 6/1996 |
| WO | WO 02/102642 | 12/2002 |

* cited by examiner

*Primary Examiner*—Paul N Dickson
*Assistant Examiner*—Drew Brown
(74) *Attorney, Agent, or Firm*—Marshall & Melhorn, LLC

(57) ABSTRACT

In one aspect, a vehicle steer axle has a horizontal axle member that has a steering axis male feature integrally formed on an end, wherein a vehicle steering knuckle, which forms a vehicle steering axis female feature, is directly rotatably coupled to the vehicle steer axle. In another aspect, a vehicle steering knuckle has a horizontal steering knuckle member that has a steering axis male feature integrally formed on an end, wherein the vehicle steering knuckle is directly rotatably coupled to a vehicle steer axle, which forms a vehicle steering axis female feature. Neither of these aspects utilize a separable kingpin.

10 Claims, 4 Drawing Sheets

VEHICLE STEER AXLE ASSEMBLY

FIELD OF THE INVENTION

The present invention relates to a vehicle steer axle assembly. More particularly, the present invention relates to a vehicle steer axle assembly that does not utilize a separable kingpin.

BACKGROUND OF THE INVENTION

In a conventional vehicle steer axle assembly, a steering knuckle includes a body, steering arms, a brake mounting plate, and a spindle for a wheel hub, bearings, and a tire assembly (see, for example, U.S. Pat. No. 6,623,019 which is incorporated herein by reference). The steering knuckle is coupled to a steer axle using a separable kingpin and the steering arms are connected to steering components of a vehicle.

Typically, the steering knuckle has a forked yoke that defines first and second bosses with aligned bores. The yoke surrounds one end of the steer axle which defines an axle boss having an axle bore aligned with the bores of the knuckle yoke. The kingpin extends through one or more of the knuckle bores, through the axle bore, and through the remaining knuckle bore to rotatably couple the steering knuckle and the steer axle together.

In these conventional steer axle assemblies, the knuckle pivots about the kingpin on a vertically inclined steering axis. Typically, bushings are disposed (for example, pressed) within the aligned bores of the knuckle to allow the knuckle to rotate relative to the kingpin.

Conventional steer axle assemblies suffer from several disadvantages. Typically, conventional steer axle assemblies allow a relatively large amount of axial and radial movement of the knuckle relative to the kingpin, which results in the kingpin joints being subjected to added wear. As a result, greater clearances are created, which permit the kingpin to shift and oscillate within the knuckle bores which reduces the useful lives of the assembly components.

Conventional kingpin designs also often require manual shimming of steer axle assembly members in order to limit the above stated axial and radial movement of the knuckle relative to the kingpin. Therefore, these designs require additional manufacturing steps and costs. Typically, the bushings result in relatively large tolerances and often require the operations of broaching or reaming of the bushings. These operations may be required to maintain close fit tolerances of the inside diameter of the bushing to the outside diameter of the kingpin.

Knuckles, such as those described above are complex and, thus result in high material, manufacturing, and labor costs. These knuckles are also disadvantageous since the kingpin can be difficult to remove for repairs and the kingpin itself increases the size and weight of the steer axle assembly. Further, the kingpin to steer axle joint is highly loaded and, consequently, requires a precision fit tolerance and a robust mechanism to lock the kingpin to the axle beam. The localized stress at this joint also typically requires that high strength materials be used for the kingpin.

What is sought is to provide vehicle steer axle assemblies that do not utilize a separable kingpin, wherein the joint(s) between the steer axle and the steering knuckle is eliminated. This should at least result in providing vehicle steer axle assemblies with lower material and labor costs, with an elimination of endplay, with a lowering of mechanical stress in the coupling area, and with an elimination of manual shimming.

SUMMARY OF THE INVENTION

A vehicle steer axle assembly comprising a vehicle steer axle and a vehicle steering knuckle, where the vehicle steer axle or the vehicle steering knuckle comprises a substantially horizontal member and a vehicle steering axis male feature integrally formed on an end portion of the horizontal member. Wherein, the vehicle steering knuckle is directly rotatably coupled to the vehicle steer axle, without utilizing a separable kingpin.

Further advantages will be apparent from the following description and appended claims, reference being made to the accompanying drawings forming a part of a specification, wherein like reference characters designate corresponding parts of several views.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
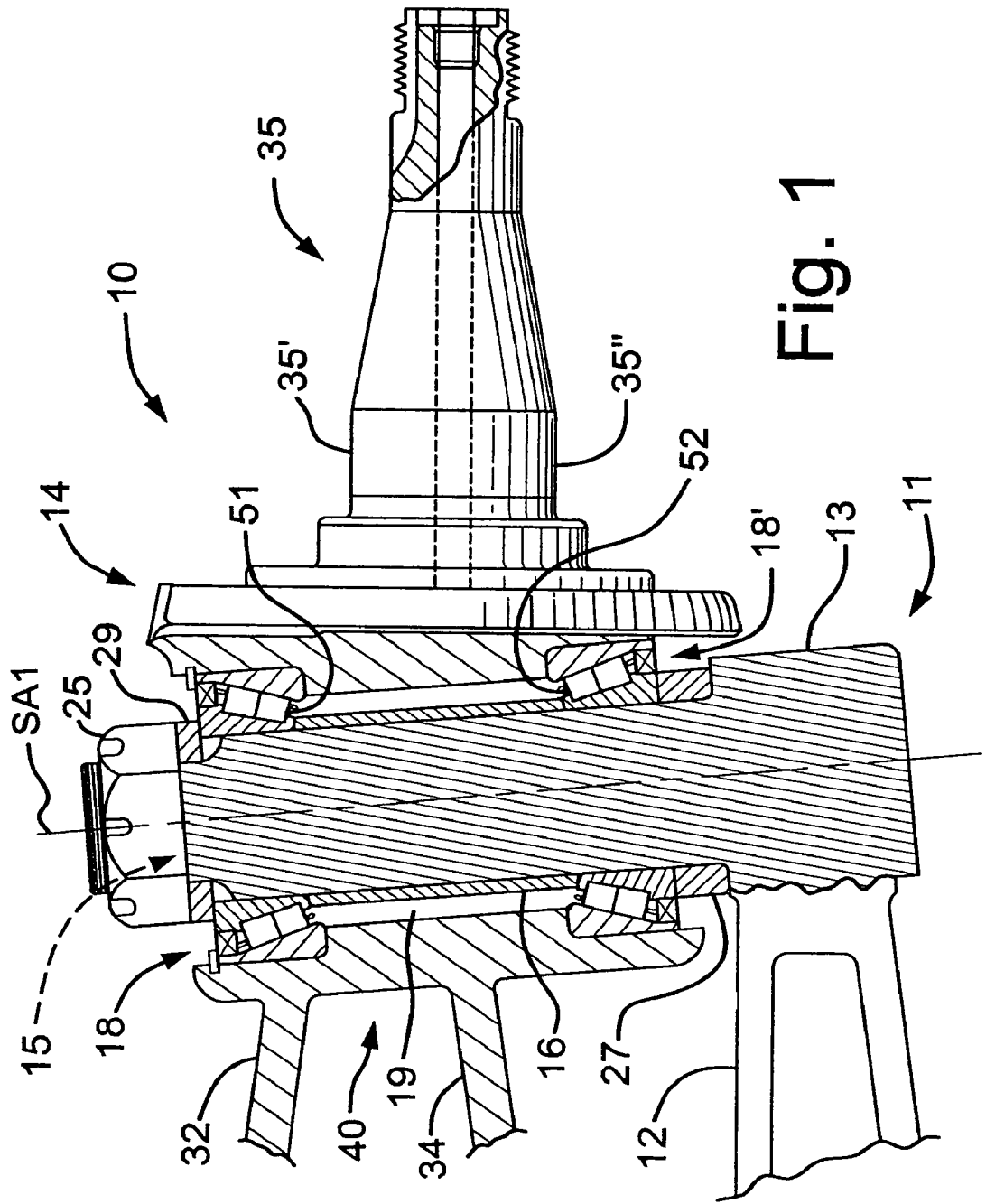
FIG. 1 is a sectional and an elevational view of a first vehicle steer axle with a first vehicle steering knuckle.

FIG. 1 illustrates a first vehicle steer axle assembly 10 that comprises a first vehicle steer axle 11 and a first vehicle steering knuckle 14 that includes steering arms 32, 34 that are part of the steering system (not shown). The steering arms 32, 34 are shown in FIG. 1 to be attached to a body 40 of the first steering knuckle 14 at a position that is generally opposite a spindle 35 that has a top spindle shoulder 35' and a bottom spindle shoulder 35". The first vehicle steer axle 11 comprises a first substantially horizontal axle member 12, which may be of a one-piece construction, that has a first vehicle steering axis male feature 13 (that is substantially vertical) which is integrally formed on an end portion thereof and which is inclined with first steering axis SA1. By integrally formed, it is meant that the two items 12, 13 are, for example, formed by forged metal, formed by cast metal, are welded and/or are adhesively bonded as a single member.

Figure 2:
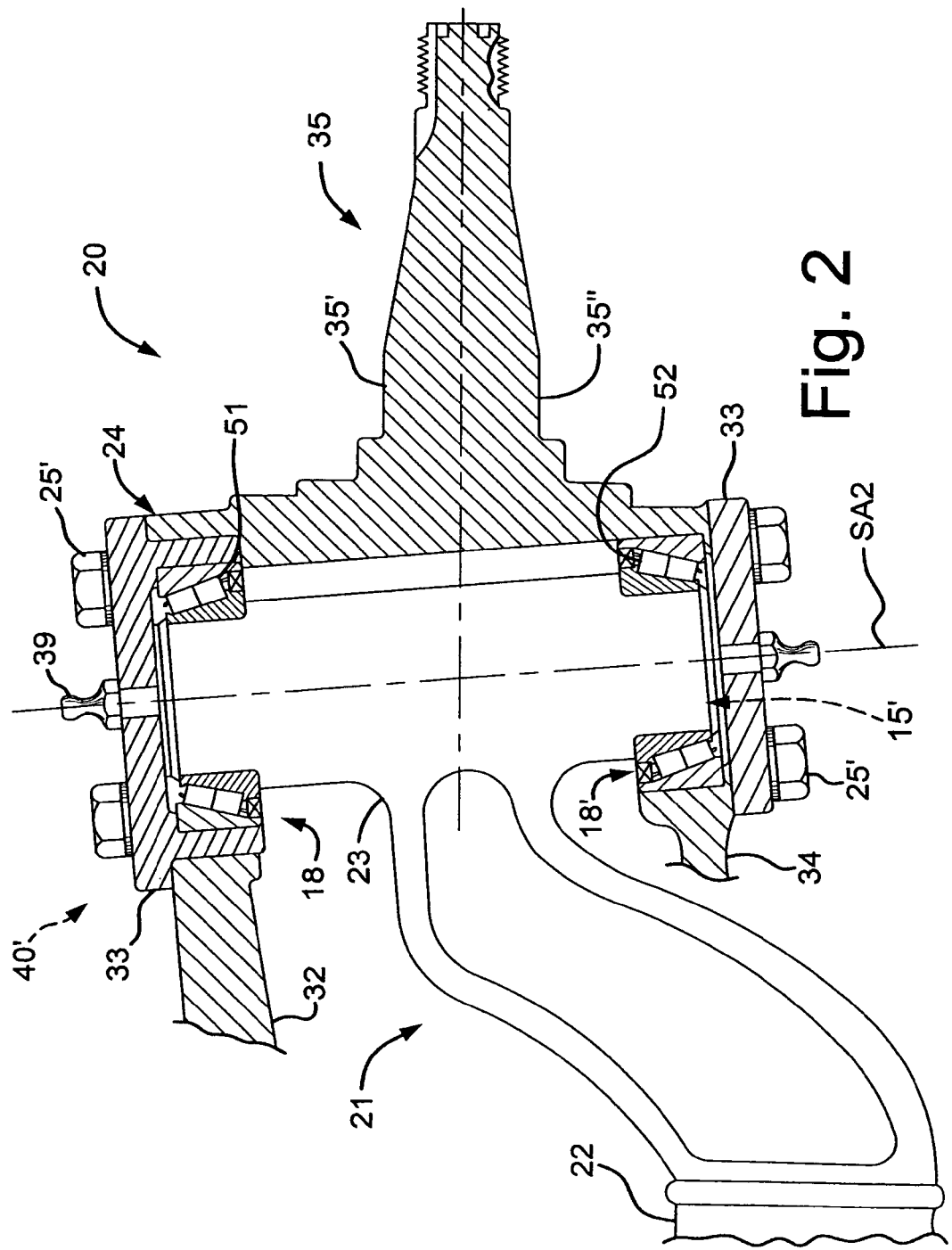
FIG. 2 is a sectional and an elevational view of a second vehicle steer axle with a second vehicle steering knuckle.
Figure 3:
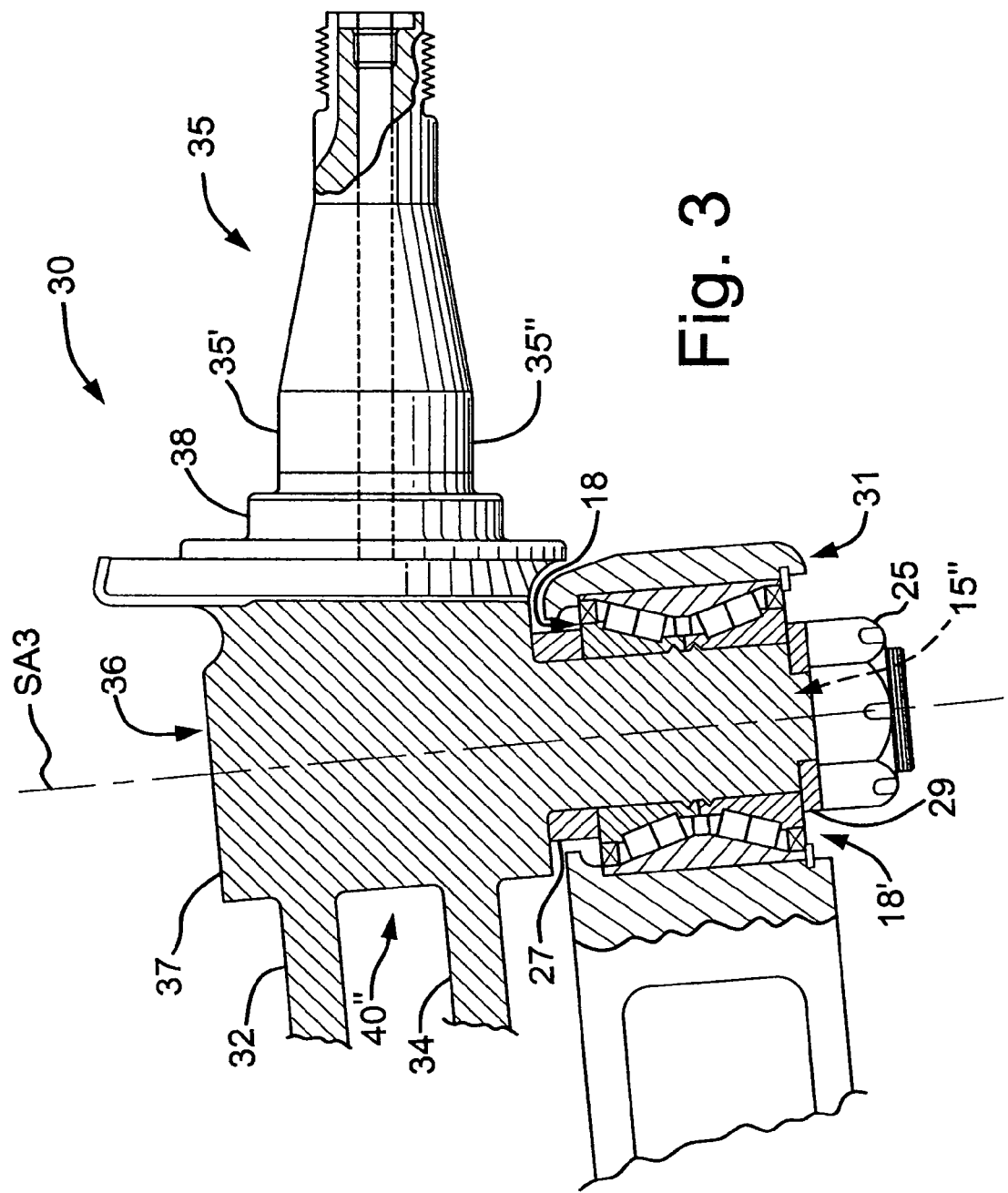
FIG. 3 is a sectional and an elevational view of a third vehicle steering knuckle with a third vehicle steer axle.
Figure 4:
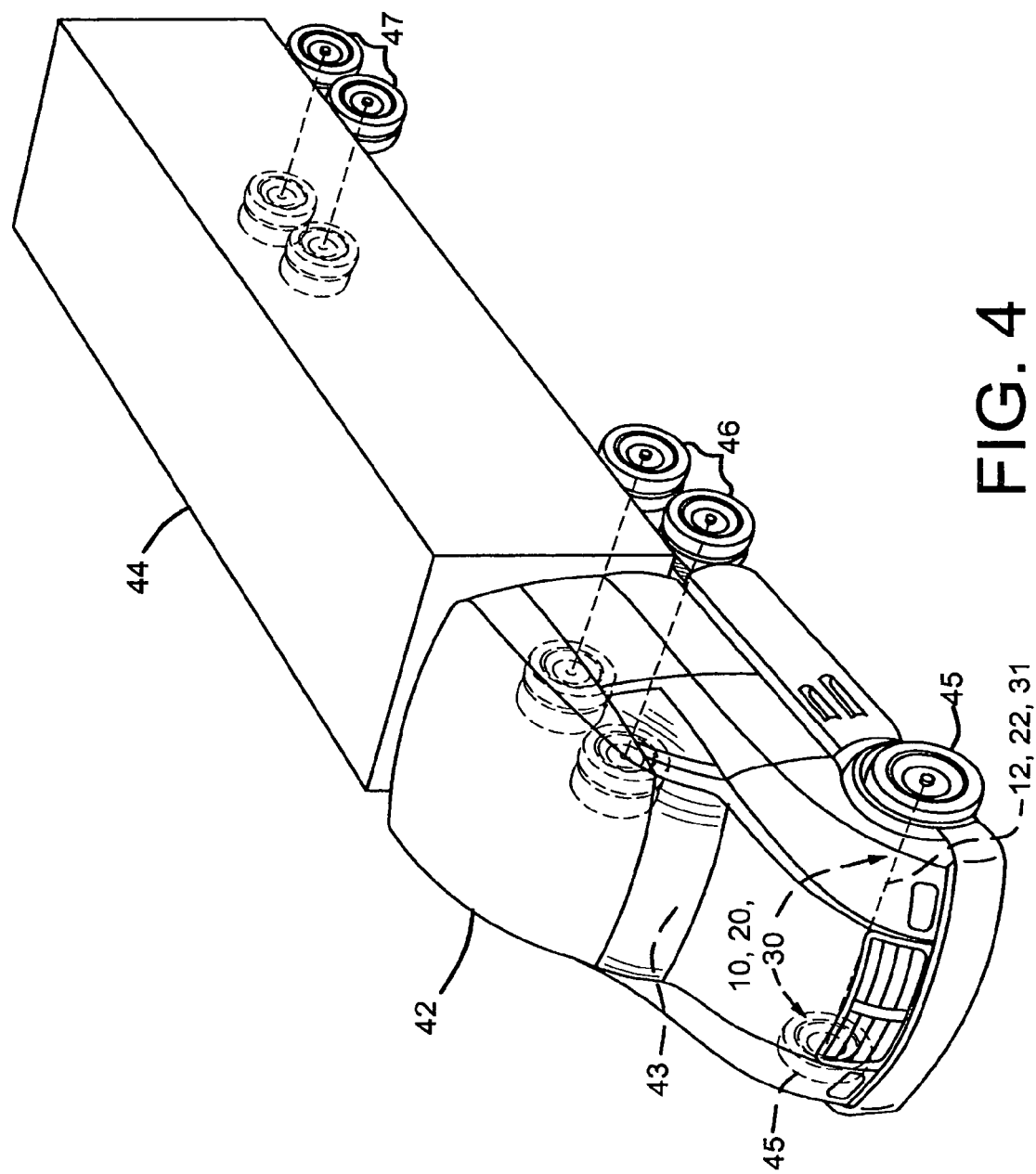
FIG. 4 is a three dimensional view of a vehicle.

Although FIG. 1 illustrates the structure of a single first vehicle steering axis male feature 13, typically, there is an essentially identical first vehicle steering axis male feature 13 (i.e., a dual structure) attached on another end portion of the horizontal steer axle member 12 (see FIG. 4). This dual structure of similar features, which are also discussed below, apply to other assemblies 20, 30 that are illustrated in FIGS. 2-3. All of these assemblies 10, 20, 30 may be utilized in large trucks (again see FIG. 4) or in a wide variety of other vehicles.

The first vehicle steering knuckle 14, which forms a first vehicle steering axis female feature 15, is directly rotatably coupled, via bearings 18, 18', to the first vehicle steer axle 11. This rotatable coupling is achieved without requiring a separable kingpin. The vehicle steering axis male feature 13 extends upwardly from the horizontal steer axle member 12 and into the vehicle steering axis female feature 15. In FIG. 1, the first vehicle steering axis male feature 13 is shown in cross-section to better illustrate that there is no separable kingpin in this assembly 10. In contrast, the first horizontal axle member 12 is not shown in cross-section.

FIG. 1 also shows various other elements like upper bearings 18 and lower bearings 18' (abutting their corresponding bearing raceways, the bearings 18, 18' also apply to assemblies 20, 30), a nut 25, a spacer 27, and a washer 29 (that also apply to assembly 30), which are utilized in similar ways as those elements disclosed in U.S. Pat. No. 6,623,019. The bearings 18, 18' may, for example, be tapered roller bearings or ball bearings that are common in the art.

As a result of eliminating the kingpin, a kingpin joint(s) is eliminated between the first steer axle 11 and the first steering knuckle 14. Also, as depicted in the embodiments of FIGS. 1 and 2, the tapered bearings 18, 18' are axially widely separated (when compared, for example, to U.S. Pat. No. 6,623, 019) and are shown to be aligned with their corresponding steer axes SA1-2. Specifically, the lower extremity 51 of the upper bearing 18 is positioned above the top spindle shoulder 35' and the upper extremity 52 of the lower bearing 18' is positioned below the bottom spindle shoulder 35".

In the first assembly 10, the nut 25 is tightened down onto the washer 29 which draws the steering axis male feature 13 up within the first steering axis female feature 15 of the first vehicle steering knuckle 14, thus applying a compressive load between the washer 29 and the spacer 27.

Manual shimming is eliminated due to a small tolerance stackup between the steering axis male feature 13, a bearing cone spacer 16, knuckle bearing shoulders (i.e., where the cone spacer 16 internally contacts the knuckle 14), and the bearings 18, 18'. Preloading of the first tapered bearing 18 and the second tapered bearing 18' is automatically set by the dimensions of the bearings 18, 18' and the mating parts 13, 14, 16. The preloading on the bearings 18, 18' is significantly lowered by the wider axial separation of the bearings 18, 18', along the steering axis SA1. Further, as a result of the preloading of the steer axis bearings 18, 18', there is an elimination of endplay. These features of the first assembly 10 apply in much the same way to the second and third assemblies 20, 30.

In the assemblies 10 20, 30, the inside diameter (ID) cone bore of the bearings 18, 18' is larger than conventional kingpin steer axles assemblies. As a result, lower mechanical stress on the vehicle steering axis male features 13, 23, 37 is realized, thereby advantageously producing steer axles 11, 21, 31 that comprise a cast metal or a forged metal (e.g., steel) without special heat treatment or costly metal alloys. In turn, the steer axles 11, 21, 31 would only require minimum machining.

Additional cost savings to produce the first steer axle 11 result from its above-stated construction, since there is no separable kingpin to produce or machine. Also, the bearings 18, 18' are separate serviceable parts which allow the first steering knuckle 14 and the first steer axle 11 to be reused. These advantages associated with the assembly 10 equally apply to the assemblies 20, 30 that are respectively illustrated in FIGS. 2 and 3 and described in more detail below.

Illustrated in FIG. 2 is a second vehicle steer axle assembly 20 that comprises a second steer axle 21 and a second vehicle steering knuckle 24 that includes the steering arms 32, 34 that are part of the steering system. The steering arms 32, 34 are shown in FIG. 2 to be attached to a body 40' of the second steering knuckle 24 and generally positioned opposite the spindle 35 which has top/bottom spindle shoulders 35', 35". Although not required, the steering arms 32, 34 are shown vertically spanning the spindle 35. The second vehicle steer axle 21 comprises a second substantially horizontal axle member 22 (possibly of a one piece construction) having a second vehicle steering axis male feature 23 (that is substantially vertical), which is integrally formed on an end portion of the second substantially horizontal axle member 22 and is inclined with the second steering axis SA2.

The second vehicle steering knuckle 24, which forms a second vehicle steering axis female feature 15', is directly rotatably coupled, via the bearings 18, 18', to the second vehicle steer axle 21. This rotatable coupling is achieved without requiring a separable kingpin. In FIG. 2, the second vehicle steer axle 21 is not shown in cross-section, in order to better illustrate that there is no separable kingpin in this embodiment 20. In contrast, the second vehicle steering knuckle 24 is shown in cross-section.

Also shown in FIG. 2 are caps 33, bolts 25', bearings 18, 18', and zerks 39. The second vehicle steering axis male feature 23 is positioned between the caps 33 which are utilized in disposing the vehicle steer axis male feature 23 within a portion of the second steering knuckle 24. The top bolts 25' and the top cap 33 attach a top portion of the second steering axis female feature 15' to a top portion of the steering axis male feature 23. This attachment may be by way of a threaded hole (not shown but common in the art) that would be defined within the second steering knuckle 24 or possibly threaded nuts (not shown but common in the art) that are external to the second steering knuckle 24.

Similarly, the bottom bolts 25' and the bottom cap 33 attach a bottom portion of the steering axis female feature 15' to a bottom portion of the steering axis male feature 23. Thus, the steering axis male feature 23 is attached between the steering axis female feature 15', where the steering axis male feature 23 may radially narrow at its top portion and at its bottom portion. The zerks 39 are utilized to provide lubricant to the bearings 18, 18'. Manual shimming is eliminated due to a small tolerance stackup between the knuckle 24, the steer axle male feature 23, and the bearings 18, 18'.

Illustrated in FIG. 3 is a vehicle steering knuckle assembly 30 having a third vehicle steer axle 31 and a third vehicle steering knuckle 36. The third vehicle steering knuckle 36 comprises a substantially horizontal steering knuckle member 38 and a third vehicle steering axis male feature 37 that is substantially vertical. The third vehicle steering axis male feature 37 is integrally formed on an end portion of the horizontal steering knuckle member 38. The third vehicle steering axis male feature 37 may radially narrow between a top portion of the steering axis male feature 37 and a bottom portion of the steering axis male feature 37.

Wherein, the third vehicle steering knuckle 36 is directly rotatably coupled, via the bearings 18, 18', to the third vehicle steer axle 31 that forms a third vehicle steering axis female feature 15". This rotatable coupling is achieved without requiring a separable kingpin.

The third vehicle steering axis male feature 37 extends downwardly from the horizontal steering knuckle member 38 and into the third vehicle steering axis female feature 15". The third vehicle steering knuckle 36 has at least one steering arm 32, 34 attached to a body 40" of the third vehicle steering knuckle 36. The body 40" may be the third vehicle steering axis male feature 37. The horizontal steering knuckle member 38 comprises a spindle 35 which may be horizontally inline with the steering arms 32, 34, as illustrated in FIG. 3.

In the third assembly 30, the nut 25 is tightened up onto the washer 29 which draws the steering axis male feature 37 down within the third steering axis female feature 15" of the third vehicle steering knuckle 36 which applies a compressive load between the washer 29 and the spacer 27. Manual shimming is eliminated due to a unitized construction of the bearings 18, 18'.

In FIG. 3, the third vehicle steering axis male feature 37 is shown in cross-section to better illustrate that there is no separable kingpin in this embodiment 30. To contrast, the horizontal steering knuckle member 38 is not shown in cross-section.

For all three assemblies 10, 20, 30, each of the steering axes SA1-3 goes through the respective axial center of the steering axis male feature 13, 23, 37. Consequently, a steering pivot axis is formed in each of these assemblies 10, 20, 30 because the respective steering axis male feature 13, 23, 37 is aligned concentrically with the inside bore of the respective mating knuckle 14, 24 or the mating steer axle 31.

As an example of where the steer assemblies 10, 20, 30 could be utilized, FIG. 4 depicts a large truck 42 (commonly known as a tractor or semi-tractor) with a compartment 43. The tractor 42 is shown connected to a trailer 44 where the tractor 42 has front wheel assemblies 45 and rear wheel assemblies 46. The trailer 44 has trailer wheel assemblies 47.

The steer assemblies 10, 20, 30 are shown as part of the front wheel assemblies where typically steering of the tractor-trailer 42, 44 takes place. The corresponding horizontal steer axles 12, 22, 31 are shown by the horizontal dashed line between the front wheel assemblies 45. Typically, the truck rear wheel assemblies 46 and the trailer wheel assemblies 47 are not utilized for steering, but the assemblies 10, 20, 30 are not limited by the location of the steering assemblies.

It is to be understood that the patent drawings are not intended to define precise proportions of the elements of the invention but that the patent drawings are intended to be utilized in conjunction with the rest of the specification. Unless expressly specified to the contrary, it should also be understood that the illustrated differences between various elements, which may be in fractions of a unit of measurement, are not intended to be utilized to precisely measure those differences between the various elements.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A vehicle steering knuckle assembly, comprising:
 a vehicle steering knuckle comprising a horizontal steering knuckle member and a vehicle steering axis male feature integrally formed on an end portion thereof and having at least one steering arm attached thereto;
 a vehicle steer axle forming a single vehicle steering axis female feature; and
 a first tapered bearing and a second tapered bearing, said single vehicle steering axis female feature and both of said bearings being located below both said horizontal knuckle member and said at least one steering arm;
 wherein, said vehicle steering axis male feature is directly rotatably coupled, via said first tapered bearing and said second tapered bearing, to said vehicle steer axle.

2. The vehicle steering knuckle assembly of claim 1, further comprising a nut, a washer, and a spacer, wherein said nut is tightened up onto said washer to draw said steering axis male feature down within said steering axis female feature, thus applying a compressive force between said washer and said spacer.

3. The vehicle steering knuckle assembly of claim 1, further comprising a spindle.

4. The vehicle steering knuckle assembly of claim 3, wherein said steering arms are inline with said spindle.

5. The vehicle steering knuckle assembly of claim 1, wherein said steering axis male feature radially narrows from a top portion of said steering axis male feature to within said steering axis female feature.

6. The vehicle steering knuckle assembly of claim 1, wherein said horizontal steering knuckle member and said vehicle steering axis male feature are integrally formed by way of a metal forging or a metal casting.

7. The vehicle steering knuckle assembly of claim 1, wherein said horizontal steering knuckle member and said vehicle steering axis male feature are integrally formed by way of welding and/or adhesive bonding.

8. The vehicle steering knuckle assembly of claim 1, wherein said vehicle steering axis male feature extends downwardly from said horizontal steering knuckle member and into said vehicle steering axis female feature.

9. The vehicle steering knuckle assembly of claim 1, wherein a preload of said first tapered bearing and said second tapered bearing is automatically set by the dimensions of mating parts.

10. A tractor comprising the steering knuckle assembly of claim 1.

* * * * *